United States Patent [19]
Gabaldon et al.

[11] Patent Number: 4,977,494
[45] Date of Patent: Dec. 11, 1990

[54] HIGH SPEED DIGITAL MOTION CONTROLLER ARCHITECTURE

[75] Inventors: John B. Gabaldon, San Diego; Daniel D. Evans, Jr., Oceanside, both of Calif.

[73] Assignee: Hughes Aircraft Company, Los Angeles, Calif.

[21] Appl. No.: 312,105

[22] Filed: Feb. 17, 1989

[51] Int. Cl.$^5$ ...................... G05B 11/00; G11C 13/00
[52] U.S. Cl. ............................ 364/167.01; 364/132; 364/513; 364/474.11; 318/568.2
[58] Field of Search ...................... 364/167.01, 474.01, 364/474.11, 474.28–474.35, 513, 132; 318/568.2

[56] References Cited

U.S. PATENT DOCUMENTS

| | | | |
|---|---|---|---|
| 4,620,118 | 10/1986 | Barber | 307/518 |
| 4,622,633 | 11/1986 | Ceccon et al. | 364/200 |
| 4,623,971 | 11/1986 | Ailman et al. | 364/513 |
| 4,623,990 | 11/1986 | Allen et al. | 365/189 |
| 4,629,955 | 12/1986 | French et al. | 364/167.01 |
| 4,635,206 | 1/1987 | Bhatia et al. | 364/513 |
| 4,773,025 | 9/1988 | Penkar et al. | 364/513 |
| 4,796,232 | 1/1989 | House | 364/900 |
| 4,835,710 | 5/1989 | Schnelle et al. | 364/513 |
| 4,912,633 | 3/1990 | Schweizer et al. | 364/200 |

Primary Examiner—Allen R. MacDonald
Attorney, Agent, or Firm—Joseph E. Szabo; Wanda K. Denson-Low

[57] ABSTRACT

A system bus (13) carrying multidimensional path data interfaces with a plurality of local microprocessors (24), one for each dimension, through a plurality of dual access memory structures (21), one for each local microprocessor (24). A local arbiter (35) controls access to each dual access memory structure (21), facilitating elimination of wait states in data transfers between the bus (13) and memory (21) and between the local microprocessor (24) and memory (21). The arbiter (35) is implemented using a programmable logic device state machine approach, which implements a mode of operation wherein the circuitry is armed for a transfer between a local microprocessor (24) and the dual access memory (21) and accomplishes such transfer with no wait states. The state machines and dual access memory (21) are driven by a clock which is twice as fast as that driving the local microprocessor (24) and the state machine implementation utilizes this fact to insure memory access to both the system bus (13), and the local microprocessor (24) with priority going to the local microprocessor (24).

20 Claims, 8 Drawing Sheets

FIG. 5A ARBITER CLOCK
FIG. 5B μP 24 DAR REQUEST
FIG. 5C SYSTEM BUS 13 DAR REQUEST
FIG. 5D STATE
FIG. 5E BUFFER 33 ENABLE
FIG. 5F BUFFER 31 ENABLE
FIG. 5G RAM 25 ENABLE
FIG. 5H μP 24 DATA TRANSFERRED HANDSHAKE
FIG. 5I SYSTEM BUS 13 DATA TRANSFERRED HANDSHAKE

HIGH SPEED DIGITAL MOTION CONTROLLER ARCHITECTURE

BACKGROUND OF THE INVENTION

1. Field of the Invention

The subject invention relates to motion controllers and, more particularly, to architecture for digital processing circuitry employed in such controllers.

2. Description of Related Art

An important parameter in motion controller design employing digital processing is the length of the sample period within which a motion control algorithm is computed. Because of the complexity of proposed controller algorithms, involving simultaneous control of multiple degrees of freedom, an increasingly shorter sample period has been desired to enable implementation of the algorithms.

The primary problem in prior art motion controller processor architectures is that they do not efficiently use available processor power. In particular, a processor may at times be disabled when its own dual access RAM is being accessed. In other cases, a processor may be required to wait before beginning computing operations while it continues transfers of previous results to memory. In other cases, the location of memory used for dual access or its allocation to several processors controlling several dimensions results in slow operation.

SUMMARY OF THE INVENTION

It is therefore an object of the invention to improve motion controllers;

It is another object of the invention to provide improved architecture for implementing a digital motion controller;

It is another object of the invention to increase the speed of operation of digital motion controllers; and It is another object of the invention to increase the efficiency with which multiple processors may be utilized in a digital motion controller.

According to the invention, a digital motion controller architecture is provided wherein a plurality of servo controller microprocessors is each supplied with trajectory path data for its respective degree of motion by a trajectory controller over a common bus. Each servo controller microprocessor is allocated to a particular dimension of motion and has closely associated therewith its own dual access memory and an arbiter to efficiently apportion access to the dual access memory between the servo controller microprocessor and the common bus. The arbiter functions such that the servo controller microprocessor has higher priority for reading and writing the dual access RAM than the trajectory controller, permitting the servo controller microprocessor to operate as fast as possible.

BRIEF DESCRIPTION OF THE DRAWINGS

The just-summarized invention will now be described in conjunction with the drawings of which.

DESCRIPTION OF THE PREFERRED EMBODIMENTS

Figure 1:
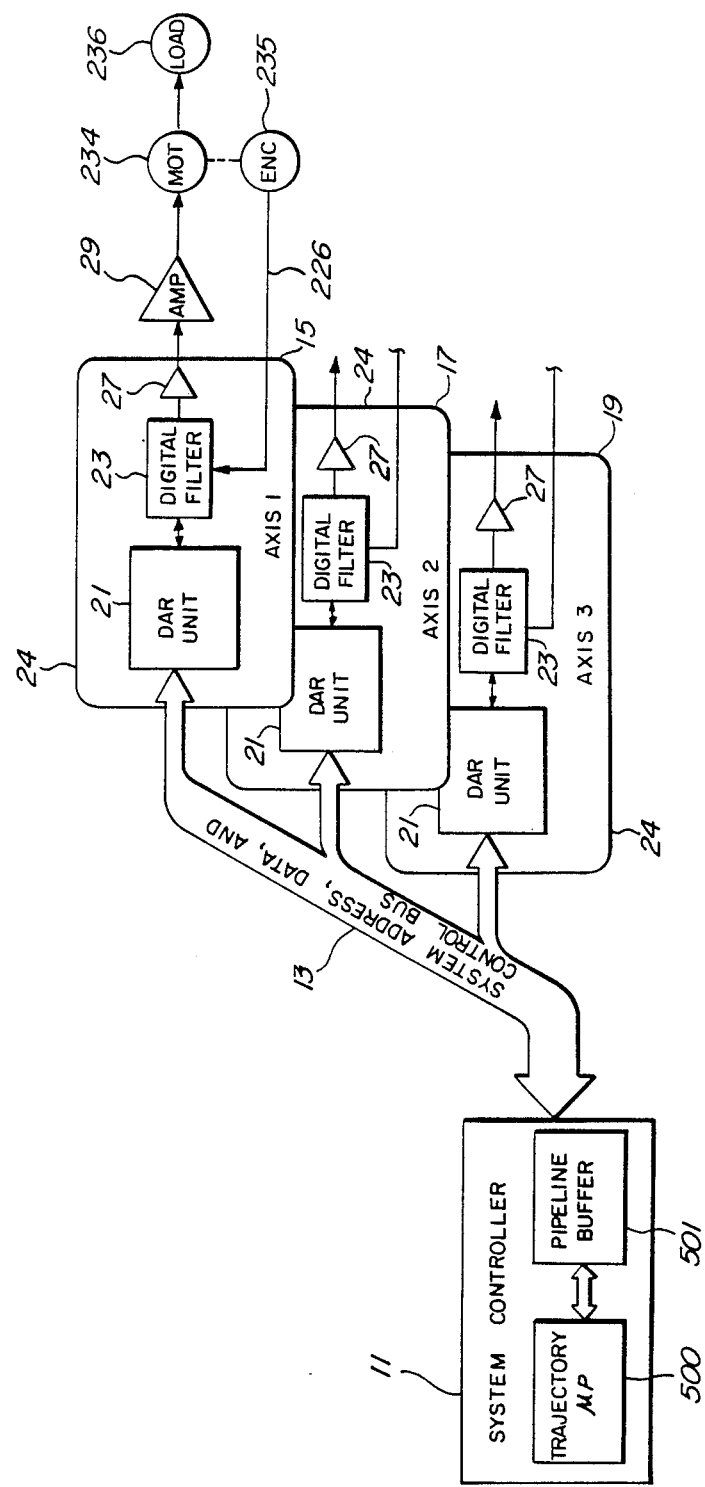
FIG. 1 is a system block diagram illustrating the preferred embodiment.
Figure 2:
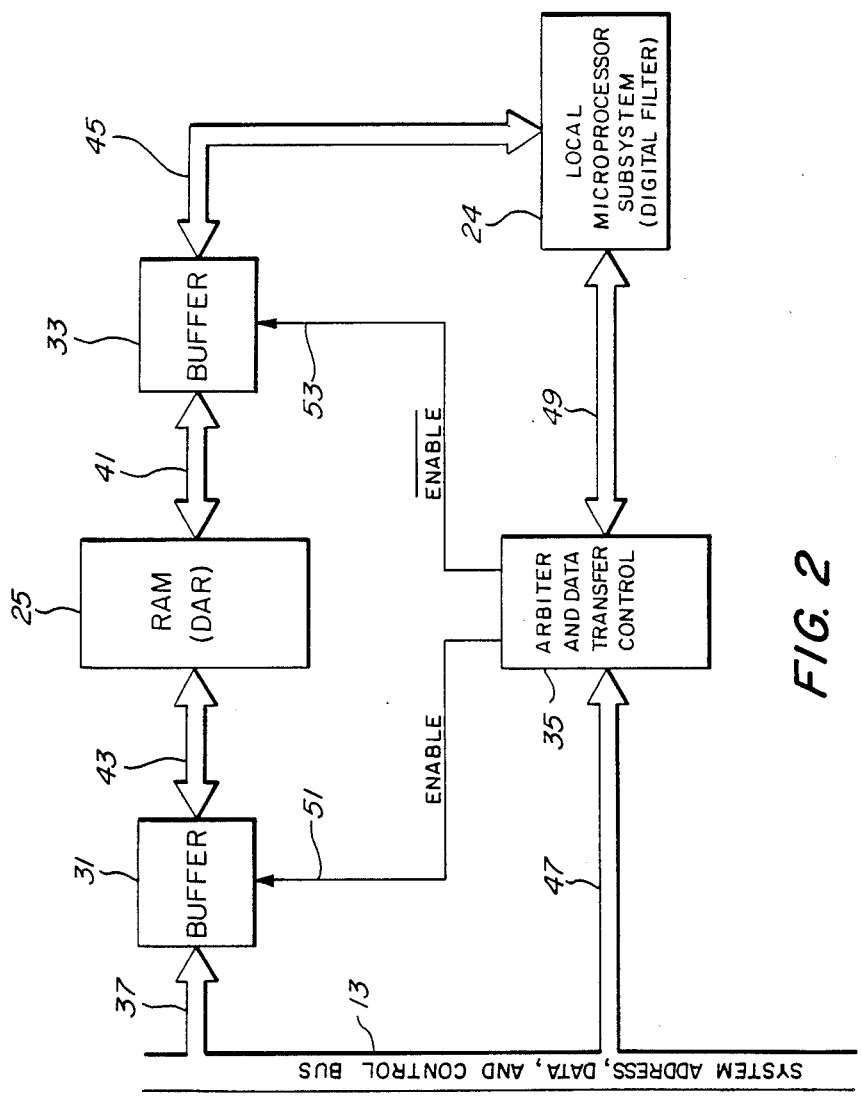
FIG. 2 is a circuit block diagram illustrating a dimension control circuit according to the preferred embodiment.

The preferred embodiment is illustrated in FIGS. 1 and 2. FIG. 1 shows a system controller 11 which supplies system addresses, data and control signals over a system bus 13 to a plurality of control boards 15, 17, 19. Each control board 15, 17, 19 controls a particular axis or dimension of motion.

Each control board 15, 17, 19 contains a DAR (dual access RAM) unit 21 and a digital filter 23, implemented by a microprocessor 24 (FIG. 2). The DAR unit 21 contains a dual access RAM 25 (FIG. 2) which is used to transfer data between the bus 13 and the microprocessor 24. Each RAM 25 has its own unique set of addresses.

The system controller 11 may supply stored path data, or, as shown in FIG. 1, may include a controller (trajectory) microprocessor 500 and a "one-deep" pipeline buffer 501 to calculate path data in real time from a high level path definition language, as known in the art. Such a microprocessor 500 typically performs a succession of "compute-write" operations wherein a path position is first computed and then written first to the buffer 501 and then out to one of the control boards 15, 17, 19.

In overall operation, the system controller 11 supplies path data for each dimension of motion to the bus 13 along with an address of the control board 15, 17, 19 to which the path data relates. The path data specifies the desired trajectory of the system plant in each particular dimension. The address supplied to the bus 13 is used by the DAR unit 21 of the addressed board to receive and store the path data.

The digital filter 23 then accesses the DAR unit 21 to retrieve the stored path data. The digital filter 23 performs a motion control algorithm employing the path data in order to generate a signal for controlling motion of the system plant. In the embodiment shown, the digital filter algorithm generates a motion control signal which is amplified by an amplifier 29 and supplied to a motor 234, which controls plant motion. A position encoder 235 such as a shaft encoder is used to develop a position feedback control signal for use in performing the control algorithm.

Figure 7:
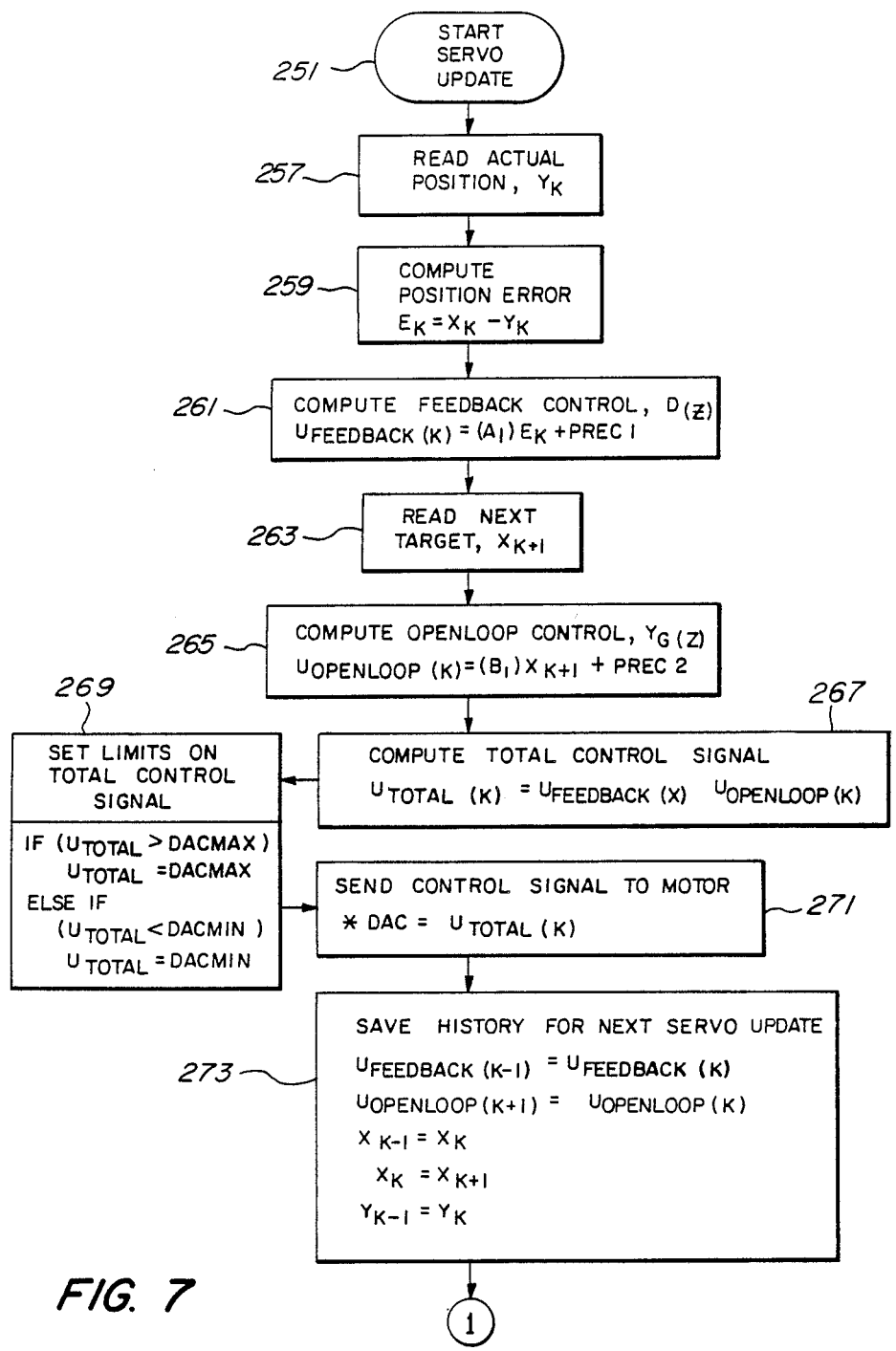
FIGS. 7 and 8 are flow charts for implementing the process of FIG. 5 in a digital processor.
Figure 8:
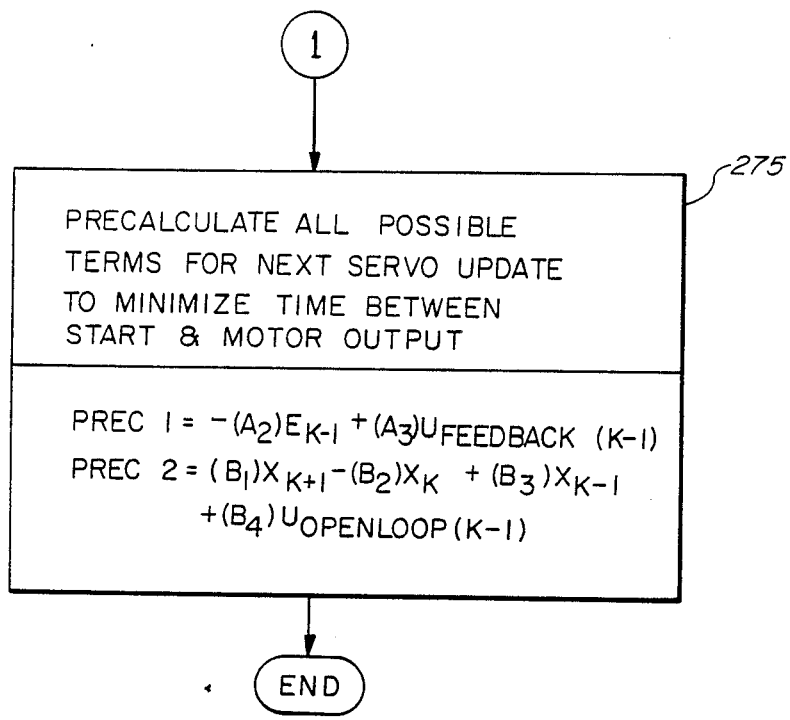

A control algorithm implementable by the digital filter 23 is shown in FIGS. 7 and 8, described hereafter in more detail. The control algorithm is performed once each sample period by the digital filter 23. The algorithm requires path data $X_{k-1} \ldots X_{k-n}$ from the system controller 11 and storage of intermediate results calculated by the local microprocessor 24 (digital filter). Hence, the length of the sample period is directly related to the frequency with which deviations from the desired path are corrected and, hence, to the accuracy of such control. Accordingly, the system bus 13 and DAR unit 21 make path data available to the digital filter 23 within the sample period. The DAR unit 21 also may store intermediate results during calculation of the algorithm by the digital filter 23.

The structure of the DAR unit 21 is shown schematically in FIG. 2. As shown in FIG. 2, the DAR unit 21 includes a RAM 25, first and second gating buffers 31, 33, and an arbiter circuit 35. The first gating buffer 31 receives signal lines 37 from the system bus 13. The signal lines 37 supply path data to be stored by the RAM 25. The second gating buffer 33 exchanges data between the RAM 25 and the local microprocessor 24. The gating buffers 31, 33 communicate with the RAM 25 over respective bidirectional buses 41, 43, while the second gating buffer 33 communicates with the microprocessor 24 over a bidirectional subsystem data bus 45. The gating buffers 31, 33 provide bus isolation only. They switch data in or out of the memory 25, but do not store it.

The local arbiter 35 receives inputs over two unidirectional buses 47, 49. The first bus 47 supplies the arbiter 35 with a data access request and control signals from the system data bus 13. The second bus 49 supplies the arbiter 35 with a data access request and control signals from the local microprocessor 24.

First and second enable lines 51, 53 emanate from the arbiter 35. The first enable line 51 supplies an enable signal to the first gating buffer 31, which enables a data transfer between the gating buffer 31 and the RAM 25. The second enable signal line 53 supplies an enable signal to the second gating buffer 33, which enables a data transfer between the gating buffer 33 and the RAM 25.

The arbiter 35 thus controls whether the system controller 11 or the local microprocessor 24 is granted access to the dual access RAM 25, depending upon which gating buffer 31, 33 it enables via the enable lines 51, 53. The arbiter 35 applies an access rule which gives priority to the local microprocessor 24. That is, whenever the local microprocessor 24 requests access to the RAM 25, data transfer into the gating buffer 31 is disabled immediately after the finish of the data cycle in progress. Any data output by the trajectory processor 500 while a transfer is being made between the second gating buffer 33 and the RAM 25 is stored in the pipeline buffer 501, as discussed in more detail hereafter, and execution of the related data access request by the arbiter 35 is delayed until the transfer involving the local microprocessor 24 is complete.

Thus, when a data transfer into the RAM 25 is desired, the arbiter 35 receives a data access request, i.e., from the microprocessor 24 or on lines 47 from the bus 13. The arbiter 35 controls the transfer into the appropriate address location by gating buffers 31, 33 via enable lines 51, 53. Similarly, when a data transfer out of RAM 25 is desired, a data access request for a transfer out is received by the arbiter 35 and the appropriate enable line 51, 53 is activated to enable transfer out of the appropriate one of the buffers 31, 33, priority again being given to transfer to the local microprocessor 24, which performs the digital filtering procedure.

In the embodiment employing the one-deep pipeline buffer 501, the controller processor 500 stores one complete data segment in the buffer 501, e.g., a 32-bit-wide calculation result, and then executes its next instruction. The pipeline buffer 501 then accesses the system bus 13, including making a request for DAR access to the arbiter 35. This feature allows the controller processor 500 to continue computing while its last computed data is transferred. Because the RAM 25 is very fast compared to the computing speed of the controller processor 500, the microprocessor 24 can complete a data transfer from/to the RAM 25 (read or write cycle) before the controller processor 500 finishes its next computation. For this same reason, the pipeline buffer 501 can complete a data transfer to the RAM (write cycle only) before the controller processor 500 finishes its next computation. During a read of the RAM 25 by the controller processor 500, however, the need for data is immediate for the next computation; hence the controller processor 500 will wait until it has access to the RAM 25. This wait is typically no longer than one microprocessor data transfer cycle to the RAM 25. This architecture takes advantage of the controller processor's intensive "compute then write" cycling.

Hardware-wise, the system bus 13 is configured as a standard VMEbus, well-known in the art. The buffers 31, 33 are configured respectively from 74ALS873 and 74ALS645 circuits manufactured by Texas Instruments, Dallas, Tex., and the RAM 25 is configured of 2K×8×4 very fast static RAM chips, Part No. CYC129-35, as manufactured by Cypress Semiconductor Corporation. The local microprocessor 24 may be a Motorola MC68000 operating at 12.5 MHz.

The system arbiter 35 is implemented with Programmable Logic Device (PLD) state machines so as to allow the local microprocessor 24 to access the dual access RAM 25 with no delays (no wait states). The state machine implementation accommodates the timing strobes required by the VMEbus 13 and the timing needs of the particular buffer and memory circuits used. The manner of implementing the arbiter 35 as programmable logic device state machines is illustrated in more detail in connection with FIGS. 3 and 4.

Figure 3:
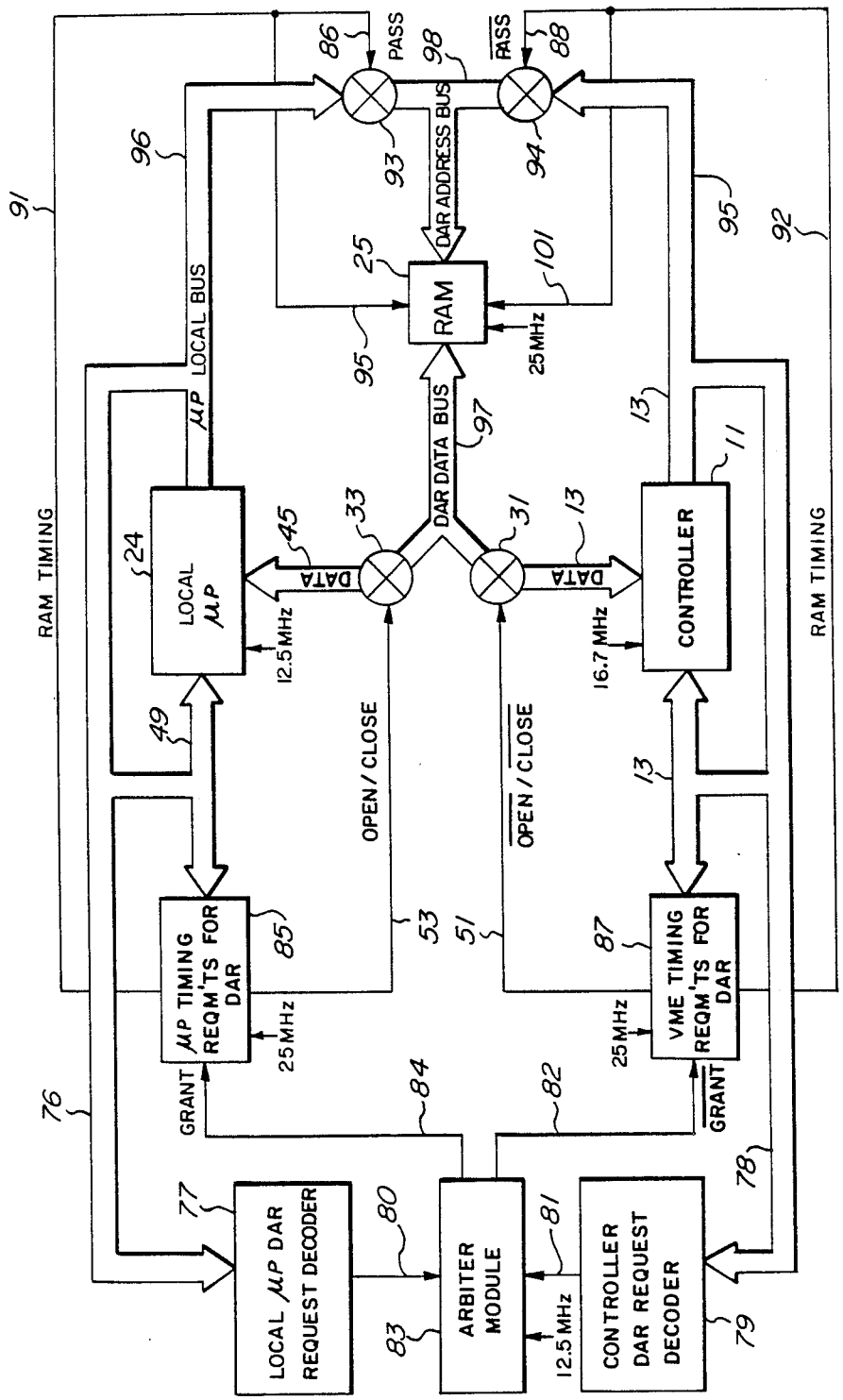
FIG. 3 is a system block diagram illustrating the structure and operation of the arbiter of the preferred embodiment.

According to FIG. 3, an arbiter module 83 receives microprocessor DAR requests on a line 80 and controller DAR requests on a line 81. The requests on lines 80 and 81 come respectively from a controller DAR request decoder 79 and a local microprocessor DAR request decoder 77. The controller decoder 79 receives address signals including an address and a transfer control signal (address strobe) on lines 78 from the VMEbus 13. The local microprocessor decoder 77 receives address signals including an address and a transfer control signal on lines 76. The decoders 77, 79 determine that access to the RAM 25 is sought and produce the DAR request signal on the appropriate output line 80, 81 to the arbiter module 83. The arbiter module 83 may then communicate a grant of access to the local microprocessor 24 or to the controller 11, as indicated by respective lines 84, 82, to respective Programmable Logic Device circuits 85, 87.

A bus 91 leaves the first PLD 85 and supplies timing control signals (read/write and byte select) to the DAR memory (RAM) 25 over lines 95. The PLD 85 additionally supplies an open/close signal on a line 53 to the gating buffer 33 and a "pass" signal on a line 86 to a switch 93. Finally, the PLD 85 exchanges control, handshake and timing signals with the local microprocessor 24 over the local bus 49. The timing control signals supplied by the PLD 85 execute the read/write timing requirements set forth by the manufacturers of the gating buffer 33, the address switch 93, the memory device 25 and the local microprocessor 24. The open/close signal causes respective opening and closing of the data bus between the local microprocessor 24 and the RAM 25. The pass signal gates the RAM address produced by the local microprocessor 24 to the address lines of the RAM 25 via the switch 93.

If the arbiter module 83 grants memory access to the controller 11 via the VMEbus 13, the PLD circuit 87 supplies the required timing signals to the RAM 25, gating buffer 31, and address switch 94, as well as signals to the pipeline buffer 501 required to accommodate the VMEbus standard protocol, i.e., handshaking signals. In this connection, the PLD 87 outputs an open/close signal to the data bus gating buffer 31, RAM timing signals (read/write and byte select) over lines 101, a pass signal on line 88, and control, handshake and timing signals over the VMEbus 13. Lines 101 and 88 comprise the bus 92, which emanates from the PLD 87.

The gating buffer 31 either opens or closes the data path between the VMEbus 13 and the RAM 25, depending on whether the control signal commands the open or closed state. As indicated by the bars over the terms "open" and "close" in FIG. 3, no simultaneous accesses by the local microprocessor 24 and controller 11 are permitted (although simultaneous requests may occur). The switch 94 gates a RAM address from the VMEbus 13 (controller 11) to the address lines of the RAM 25 in response to the pass signal from the PLD 87.

The switches 93, 94 are preferably embodied as 74F257 multiplexers, as manufactured by Signetics Corporation. The PLDs 83, 85, 87 may be GAL20V8-15, GAL16V8-15 integrated circuits, as made by Lattice Semiconductor Corporation.

Figure 4:
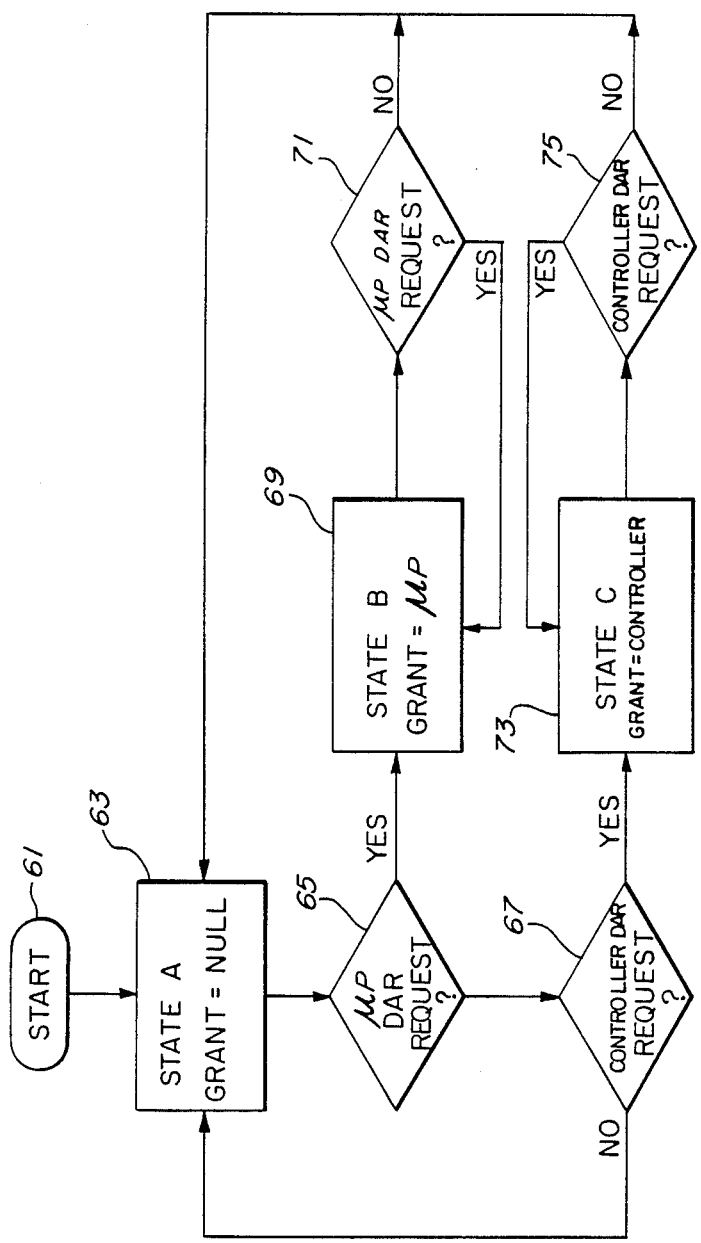
FIG. 4 is a flow chart illustrating the operation of an arbiter module according to the preferred embodiment.

The arbiter module 83 is also implemented as a programmable logic device (PLD) state machine. A flow chart illustrating the operation and structure of the arbiter module 83 is shown in FIG. 4. The arbiter module becomes functional at step 61 upon power-up or reset. From there the flow proceeds to block 63, where the module 83 is in a state denoted state A. In this state, access has been granted to neither the controller 11 nor the local microprocessor 24. State A may therefore be referred to as the null state. In state A, the arbiter module 83 awaits either a microprocessor DAR access request or a controller access request, as indicated by steps 65 and 67. In state A, however, the circuitry of FIG. 3 is configured to begin execution of the DAR request from microprocessor 24 immediately upon receipt of the DAR request. Accordingly, in state A, switch 93 is open, switch 94 is closed, and one control logic level required by the buffer 33 is already being supplied thereto. Thus, arbiter 35 is "armed," but it is not actually enabling the gating buffer 33 for data access. This state of readiness will allow immediate access (no wait-states) to the RAM 25 should the priority request arrive. Since step 65 precedes step 67, priority is granted to the local microprocessor 24.

If the local microprocessor 24 requests RAM access, the arbiter module 83 enters state B, indicated by block 69. The PLD 85 then detects the microprocessor access grant state on line 84 and begins operation of its state machine to execute the control and timing requirements illustrated in connection with FIG. 3. If the access grant to the local microprocessor 24 is still being executed at step 71, the arbiter module 83 remains in state B, as indicated by the "YES" signal line. If the input of the arbiter module 83 is not receiving a DAR request at step 71, the arbiter module 83 returns to state A. If step 65 is not satisfied, but step 67 is satisfied, the arbiter module enters state C, block 73, wherein the PLD 87 becomes active to generate the timing and handshaking signals required to execute a data transfer between the VMEbus 13 and the RAM 25. In state C, the arbiter module 83 monitors the state of the controller DAR request during a transfer, as indicated in step 75. If the controller DAR request is inactive, the flow returns to state A. If the controller DAR request is still active, the machine remains in state C.

A high speed clock is running during the data transfer, and the controller DAR request line is tested many times by test 75 during this clock. When one data transfer is completed, the step 75 is exited to state A. Similarly, the DAR request line is tested many times by test 71 due to the high speed clock, and the step 71 is exited after a local microprocessor data transfer is complete.

A feature of the Motorola MC68000 microprocessor used as the local microprocessor 24 assures that the controller 11 will not be denied access for a lengthy period of time, and thus ensures achievement of the object of permitting the controller 11 to output path information as fast as the local microprocessor 24 can use it. The MC68000 microprocessor runs at a 12.5-MHz clock rate and cannot raise another data transfer request for at least three-fourths of a microprocessor clock period after a transfer of data, an operand or a command. The arbiter clock runs at 25 MHz, twice as fast as the microprocessor clock. Since the steps 71, 75 are performed each arbiter clock cycle, the machine will return to state A and detect a waiting data access request from the controller 11 before the local microprocessor 24 can raise another request. The pipeline buffer 501 also employs this mode of operation such that, when the arbiter module is in state C, a waiting local microprocessor request will be detected before a request can be raised by the controller 11.

The pipeline buffer 501 may be constructed from a 74ALS646 integrated circuit as manufactured by Texas Instruments and associated sequencing circuitry, which may also be implemented with programmable logic devices. The sequencing circuitry not only controls the timing required by the ALS646 circuit, but also controls the sequence of events which must occur to get data across the bus 13. In particular, if the controller processor 501 tries to access RAM 25 while the local microprocessor 24 is accessing the RAM 25, the buffer 501 stays on the bus 13, holds its DAR request until the processor 24 is finished with its access and prevents the controller processor 500 from overwriting the pipeline buffer 501.

Figure 5:
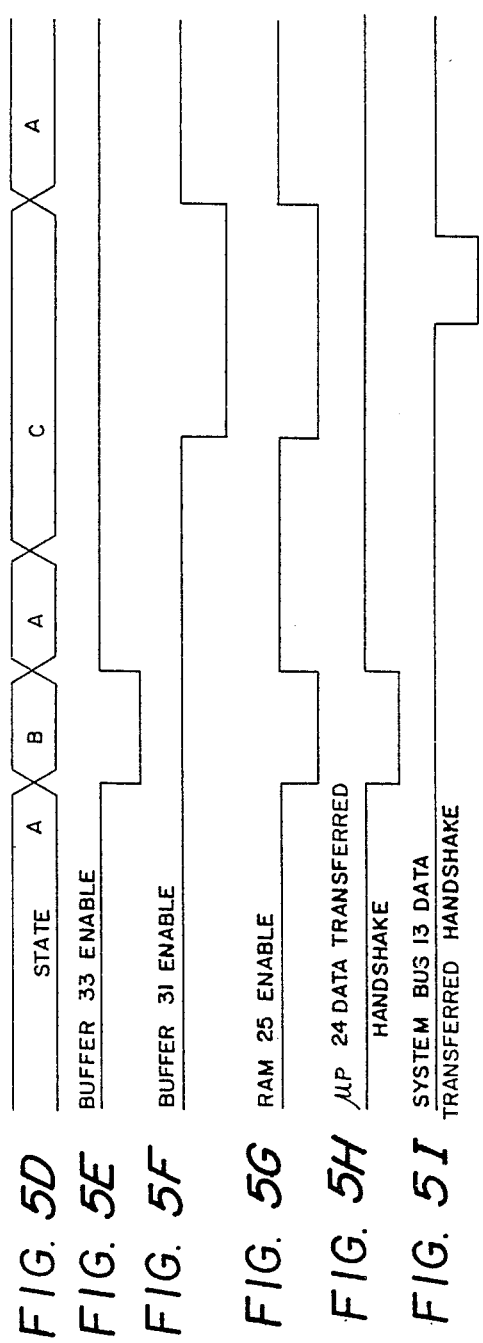
FIG. 5 is a timing diagram illustrating timing of access operations in the preferred embodiment.

FIG. 5 illustrates timing of access operations involving the RAM 25. FIG. 5A shows the arbiter clock, with each rising edge of a clock pulse numbered $t_1$, $t_2$, $t_3$ ... $t_8$. At edge $t_1$, there are no requests for access to the RAM 25. At edge $t_2$, the system bus 13 and the microprocessor 24 are both requesting access simultaneously. The result is a transition from state A to state B. The gating buffer 33 and the RAM 25 are enabled and a data transfer acknowledge is raised by the timing module (PLD) 85 to advise the local microprocessor 24 that data is available for transfer. At edge $t_3$, the handshake is recognized by the local microprocessor 24, and the data is transferred. The timing module 85 disables the gating buffer 33, terminates handshaking, and there is a state transition from state B to state A.

At edge $t_4$, a transition from state A to state C occurs. At edge $t_5$, the gating buffer 31 and the RAM 25 are enabled by the timing module 87. At edge $t_6$, the timing module 87 produces a handshake (data transfer acknowledge), and data transfer with the system bus 13 occurs. At edge $t_7$, the handshake with the system bus is disabled by the timing module 87 and the pipeline buffer 501. The RAM 25 and the gating buffer 31 are also disabled by the timing module 87, and the state transitions from state C to state A. At edge $t_8$ there is again no request activity present, and the apparatus is in state A.

Considering the above operation, it will be noted that, in a state A to state B transition, data transfer begins immediately because many of the enable and control signals are already at the correct logic levels to initiate a data transfer, as discussed previously. A state A to state C transition requires more clock edges to begin a data transfer because the enable and control signals had been armed to initiate a data transfer to the local microprocessor 24, but now must be switched in a sequence selected to satisfy the hardware timing requirements of timing modules 85, 87, gating buffer 31, address switch 94 and RAM 25.

Figure 6:
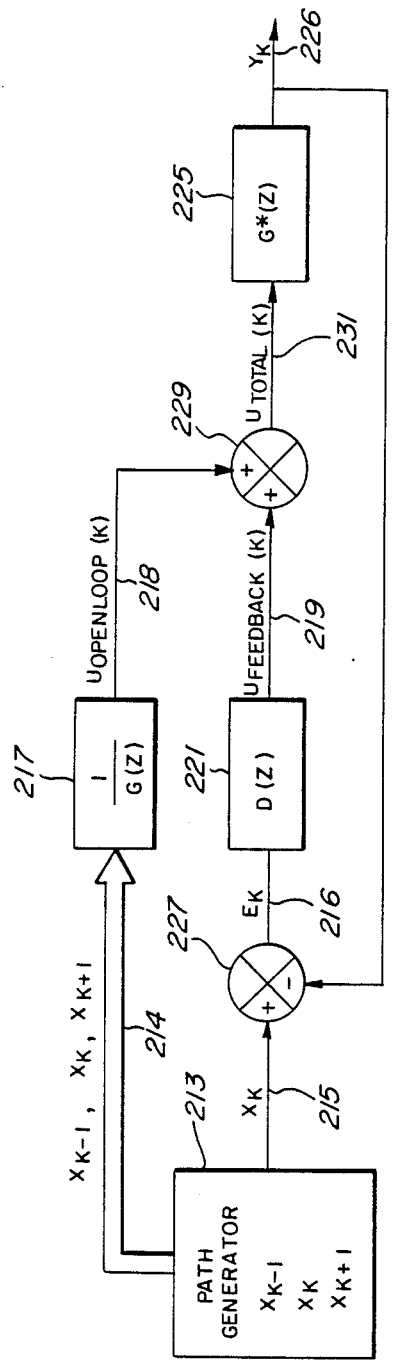
FIG. 6 is a schematic block diagram of a motion controller process.

An illustration of a procedure by which the local microprocessor 24 may generate a control signal for controlling motion in its appointed dimension is shown in FIG. 6. FIG. 6 shows a path generator 213, which outputs desired path position data $X_{k-1}$, $X_k$, $X_{k+1}$ and $X_k$ over respective output lines 214, 215. The path data $X_{k-n}$ is the path position data for one-dimensional path motion.

The output line 214 of the path generator 213 is connected to the input of a computing element 217 which applies a transfer function $1/G(Z)$ to the path data and outputs an open loop control voltage $U_{open\ loop\ (k)}$ on a line 218. The line 215 is connected as one input to a summer 227 which outputs an error signal $E_k$ on a line 216 to a computational element 221. The computational element 221 applies a feedback control transfer function $D(Z)$ on the input $E_k$ and outputs a feedback control voltage $U_{feedback\ (k)}$ on a line 219. Lines 218 and 219 are connected to a summer 29 which adds the open loop and feedback control voltages $U_{open\ loop}$, $U_{feedback\ (k)}$ to produce a total output control voltage $U_{total\ (k)}$ on a line 231. The line 231 is applied to the actual plant 225, which results in an actual path location or position $Y_k$, which is outputted on a line 226. The actual path location $Y_k$ is also fed back to the first summer 227 and subtracted from the desired path signal $X_k$ to yield the feedback error signal $E_k$, $E_k = X_k - Y_k$. The transfer function of the actual plant 225 is represented by $G^*(Z)$.

An exemplary digital transfer function is $$G^*(Z) = \frac{K(Z - A)}{(Z - 1)(Z - B)}. \quad (1)$$

$G^*(Z)$ represents a plant including a voltage mode amplifier, motor, load and encoder, as illustrated, for example, in FIG. 1.

In application of the open loop and feedback control described to a digital servo positioning system for a wire bonder, the feedback control, $D(z)$, is a standard lead-lag control based on the present error and is implemented in difference equation form, i.e., $(U_{feedback}(k) = (A_1)\ \text{Error}_k - (A_2)\ \text{Error}_{k-1} + (A_3)\ U_{feedback}\ (k-1))$, where the parameters $A_1$, $A_2$, and $A_3$ are chosen to yield a stable system. While in this case a lead-lag control is employed, the feedback control can be any one of the many conventional forms used in the industry.

The open loop control is generated by solving a difference equation derived from the plant model $G(z)$, which represents the dynamics of a DC motor, amplifier, lead screw, load and encoder. The open loop difference equation is solved for $U_{open\ loop}\ (k) = (B_1)\ X_{k+1} - (B_2)\ X_k + (B_3)\ X_{k-1} + (B_4)\ U_{open\ loop}\ (k-1)$. An equation of this form is called noncausal since the computation of the present control, $U_{open\ loop\ (k)}$, requires the knowledge of a future event, namely $X_{k+1}$. Noncausal equations are not possible in feedback control since a future error, $E_{k+1}$ is not known. However, the open loop calculation requires the future target point, $X_{k+1}$ along the path. In a digital positioning system, such as the one under discussion, the target positions are precomputed using the well-known trapezoidal velocity profile and are thus available. If the target positions are not known in advance, then the target command could be delayed one sample period. Thus, the next target would be known one sample period before it is commanded.

To illustrate, a difference equation may be found which will predict $U_k$ for $X_{k+1}$ for the plant shown in FIG. 2. The transfer function $G^*(Z)$ is inverted as follows:

$$\frac{1}{G(Z)} = \frac{U(Z)}{X(Z)} = \frac{(Z-1)(Z-B)}{K(Z-A)} \quad (2)$$

Simplifying this equation (2) yields:

$$U_K = \frac{1}{K}[X_{K+1} - (1 + B)X_K + (B)X_{K-1} + (KA)U_{K-1}] \quad (3)$$

Thus, $U_k$ is a feed-forward value which is dependent on the plant parameters (dynamics) and the next desired position $X_{k+1}$. Equation (3) is implemented by computing element 217 in FIG. 6. Equation, (3) may also be rewritten in terms of velocities $V_n$ as follows:

$$U_K = \left(\frac{1}{K}\right)[V_K - (B)V_{K-1}] + AU_{K-1} \quad (4)$$

As discussed above, the digital filter 23 is preferably embodied in, for example, a Motorola 68000 microprocessor operating at $12\frac{1}{2}$ MHz. The digital filter 23 may also be embodied in various forms of digital logic, other programmed processors, or special purpose signal processor circuitry.

The digital filter 23 implemented by the local microprocessor 24 performs the function of the filter 217, filter 221, and summing junctions 227 and 229 in FIG. 6. The local microprocessor 24 receives the path or trajectory information provided by the path generator 213 and stored in the RAM 25. The local microprocessor 24 outputs the total control signal $U_{total}$ to the digital-to-analog converter. The digital-to-analog converter 27 in turn provides an analog control signal to the amplifier 29 for controlling the motor 234. The encoder 235 tracks the actual motor position and provides a feedback signal on a line 226 to the local microprocessor 24. The DAC 27, amplifier 29, motor 234, encoder 235, and load 236 comprise a plant having the transfer function $G^*(Z)$.

In an actual embodiment, a Pacific Scientific 2VM-62020-7 DC servo motor has been used for the motor 234 and a Disk Instruments rotary optical encoder M-98A-1000-ICLP yielding 4,000 counts per revolution with quadrature has been used for encoder 235. In that embodiment, the amplifier 29 is a 40-volt, 12-amp Glentek GA45555 linear voltage mode amplifier. The digital-to-analog converter 27 is a Burr-Brown AD667.

A flow chart for programming the Motorola MC68000 microprocessor to perform the digital filtering functions is illustrated in FIGS. 7 and 8. Performance of the routine starts at the beginning of every sample period with step 251. Execution of the filter algorithm continues sequentially with steps 257, 259, 261, etc. of FIGS. 7 and 8. The entire algorithm is computed within the sample period. The algorithm is performed autonomously by each local microprocessor 24 for the respective dimension whose path data is supplied to that card through the associated RAM 25.

The actual position of the motor 234 is indicated over line 226 and is read at step 257. In step 259, the position error, $E_k = X_k - Y_k$, is determined in accordance with the summing junction 227 in FIG. 6. In step 261, the feedback control D(z) is computed. This term D(z) is computed by multiplying a constant $A_1$ times the error signal $E_k$ and adding to it a quantity denoted Prec 1, which is a precalculated quantity, as described hereafter. In step 263, the next target, $X_{k+1}$, is read from the RAM 25 into the processor 24. As illustrated in step 265, the open loop control parameter is calculated by multiplying a constant $B_1$ times $X_{k+1}$ and adding to it a second precalculated value Prec 2 as described hereafter. In the next step 267, the total control signal is determined in accordance with the summing junction 229 in FIG. 6.

In step 269, a limit test is performed on the total control signal $U_{total}$. The signal, $U_{total}$, is compared to parameters denoted DACMAX and DACMIN and clipped if necessary.

These parameters are selected to limit the input voltage signal within a range matched to the amplifier 29. The control signal $U_{total}$ is then sent to the DAC 27 and then to the amp 29 and motor 234 in step 271. The parameters determined during this servo update are saved in step 273 for the next servo update 251. The routine then proceeds to block 275, where all possible terms for the next servo update 251 are calculated to minimize the time between the beginning of the sample period, step 251, and the output of $U_{total}$ to the DAC-/amp/motor, step 273. In this step 275, the two parameters previously referred to Prec 1 and Prec 2 are calculated according to the equations established.

In a preferred embodiment, all history terms are initially set to zero. The sample period is 1 millisecond and generates a high priority interrupt to the processor so that the beginning of the digital servo algorithm is synchronized to the beginning of every sample period. The path generator 213 can be run before starting the move or concurrently therewith. The path generator 213 (controller 11 in FIG. 1) may read out previously-stored path information, or may be a computer which calculates detailed trajectory data for a target path in response to general position commands, as desired.

The disclosed architecture has the ability to rapidly write data, commands, operands, instructions, etc., to a plurality of local microprocessors because each of the local microprocessors 24 can quickly access its associated RAM 25 without having to arbite with the controller 11 or with other local processors trying to simultaneously access the RAM 25. Improved operation is achieved because an unique segment of the entire address range available to the controller 11 is assigned to a local processor 24 and its local arbiter 35.

Those skilled in the art will appreciate that various adaptations and modifications of the just-described embodiment may be made without departing from the scope and spirit of the invention. Therefore, it is to be understood that, within the scope of the appended claims, the invention may be practiced other than as specifically described herein.

What is claimed is:

1. A digital architecture for a motion controller comprising:
   a system bus for supplying path data, said path data including a plurality of subsets of path data, each subset corresponding to a desired trajectory of a selected dimension of motion;
   a plurality of digital processor means, one for each dimension of motion, each processor means for computing a control signal for its dimension of motion utilizing the subset of path data corresponding thereto;
   a plurality of memory means, each connected to said system bus and to a respective one of said plurality of digital processor means for receiving and storing the corresponding subset of said path data from said bus and for storing data transferred to and from the connected processor;
   a plurality of control means, one connected to each of said memory means, for receiving control signals from said system bus and from said respective one of said plurality of digital processor means connected to the memory means, for controlling access to the connected memory means in response to said control signals;
   wherein each said memory means comprises:
   a random access memory means for storing said corresponding subset of path data;
   a first gating buffer means responsive to a first buffer gating control signal for gating said subset of path data between said system bus and said random access memory means; and
   a second gating buffer means responsive to a second buffer gating control signal for gating said subset of path data between said respective one of said digital processor means and said random access memory means;
   wherein each said control means comprises:
   means responsive to a first request for access received over said system bus to generate a first access grant control signal and to a second request for access received from said respective one of said digital processor means to generate a second access grant control signal; and
   sequencer means responsive to said first access grant control signal to generate said first buffer gating control signal and to said second access grant control signal to generate said second buffer gating control signal;
   wherein said means responsive to a request for access comprises a state machine means for occupying a first state and a second state, said first state being entered in response to a said second request for access, the second state being entered in response to a said first request for access;
   said architecture further including a first clock means producing a succession of clock edges and wherein said state machine means runs in response to said succession of clock edges and generates said second access grant signal at a first edge of said clock; and wherein said sequencer means enables said second gating buffer means and said random access memory means and causes completion of data transfer between said respective one of said digital processor means and said random access memory means upon occurrence of the next clock edge in said succession after said first clock edge;

said architecture further including second clock means for driving said respective one of said digital processor means, the clock rate of said first clock means being selected to be higher than that of said second clock means and such that a data transfer is achieved between said respective one of said digital processor means and said random access memory means before said digital processor means is capable of raising another said second request for access.

2. The architecture of claim 1 further including:

a trajectory processor means for computing and writing said path data as path data words; and a buffer means for receiving said path data words from said trajectory processor means, for storing said path data words one word at a time, and for outputting said path data words to said system bus.

3. The architecture of claim 1 wherein said sequencer means sets a plurality of control signals in preparation for occurrence of said first state of said state machine.

4. The architecture of claim 3 wherein said plurality of control signals comprise said second buffer gating control signal and said second address switch control signal.

5. The architecture of claim 1 wherein said control signals include first address signals received over said system bus and second address signals generated by the respective one of said digital processor means and wherein said control means further comprises:

first switch means for switching said first address signals to said random access memory means in response to a first address switch control signal; and second switch means for switching said second address signals to said random access memory means in response to a second address switch control signal.

6. The architecture of claim 5 wherein said sequencer means further generates said first and second address switch control signals.

7. The architecture of claim 6 wherein said sequencer means further generates a first handshaking signal for accomplishing a data transfer between said random access memory means and said system bus and a second handshaking signal for accomplishing a data transfer between said random access memory means and the respective one of said digital processor means.

8. The architecture of claim 7 wherein said sequencer means further comprises:

first programmable logic device means receiving said first access grant control signal and responsive thereto for generating said first buffer gating control signal, said first address switch control signal and said first handshaking signal; and second programmable logic device means receiving said second access grant control signal and responsive thereto for generating said second buffer gating control signal, said second address switch control signal and said second handshaking signal.

9. The architecture of claim 1 wherein, if said means responsive to a request for access receives a said first request for access and a second request for access simultaneously, said sequencer means delays generation of said first buffer gating control signal and immediately generates said second buffer gating control signal.

10. Circuitry for transferring path data words between a controller processor means for calculating path data and having an output means for outputting path data words and controller address signals and a local processor means for outputting local processor address signals and generating a control signal for controlling a single dimension of path motion in response to said path data words, said circuitry comprising:

a single stage pipeline buffer means having an output and an input connected to the output means of said controller processor means for storing a first path data work output by said processor means while said processor means is calculating a second path data word;

a bus means connected to the output of said pipeline buffer means;

a random access memory means;

a first gating buffer means connected between said bus means and said random access memory means for gating data therebetween in response to a first buffer gating control signal;

a second gating buffer means connected between said local processor means and said random access memory means for gating data therebetween in response to a second buffer gating control signal;

first switch means for gating addresses from said bus means to said random access memory means in response to a first address gating control signal;

second switch means for gating addresses from said local processor means to said random access memory means in response to a second address gating control signal; and control means responsive to said controller address signals and local processor address signals for sequencing generation of said first and second buffer gating control signals and said first and second address gating control signals for controlling data transfers between said controller processor means and said random access memory means and between said local processor means and said random access memory means;

wherein said control means includes a state machine means for occupying a null state, a first state, and a second state, said first state being entered in response to receipt of said local processor address signals, the second state being entered in response to receipt of said controller address signals; and wherein, in said null state, said control means produces said second address gating control signal, such that said second switch means is closed during said null state, thereby arming said circuitry for a data transfer between said local processor means and said random access memory means.

11. The circuitry of claim 10 further including a first clock means producing a succession of clock edges, and wherein said state machine runs in response to said first clock means.

12. The circuitry of claim 11 wherein said control means causes completion of data transfer between said local processor means and said random access memory means through said second gating buffer means during the period of two said clock edges.

13. The circuitry of claim 12 further including second clock means for driving said local processor means, the clock rate of said first clock means being selected to be higher than that of said second clock means and such that a data transfer is achieved between said local processor means and said random access memory means before said local processor means is capable of generating a second set of local processor address control signals.

14. The circuitry of claim 10 wherein said control means further operates said random access memory means at a speed higher than the computational speed of said controller processor means or local processor means such that a data transfer between the local processor means and random access memory means is achieved before the controller processor means can complete computation of a path data word, and wherein said control means further operates such that a data word to be transferred from the controller processor means is stored in the pipeline buffer means while a transfer of data between the local processor means and the random access memory means is occurring, and such that a transfer to the random access memory means from the pipeline buffer means is completed before the controller processor means completes its next computation.

15. The circuitry of claim 14 wherein when said controller processor means requires a bus data transfer from the random access memory means while a local data transfer between the local processor means and random access memory means is occurring, said controller processor means waits until completion of said local data transfer before requesting said bus data transfer.

16. Circuitry for transferring path data words between a controller processor means for calculating path data and having an output means for outputting path data words and controller address signals and a local processor means for outputting local processor address signals and generating a control signal for controlling a single dimension of path motion in response to said path data words, said circuitry comprising:
   a single stage pipeline buffer means having an output and an input connected to the output means of said controller processor means for storing a first path data word output by said processor means while said processor means is calculating a second path data word;
   a bus means connected to the output of said pipeline buffer means;
   a random access memory means;
   a first gating buffer means connected between said bus means and said random access memory means for gating data therebetween in response to a first buffer gating control signal;
   a second gating buffer means connected between said local processor means and said random access memory means for gating data therebetween in response to a second buffer gating control signal;
   first switch means for gating addresses from said bus means to said random access memory means in response to a first address gating control signal;
   second switch means for gating addresses from said local processor means to said random access memory means in response to a second address gating control signal; and
   control means responsive to said controller address signals and local processor address signals for sequencing generation of said first and second buffer gating control signals and said first and second address gating control signals for controlling data transfers between said controller processor means and said random access memory means and between said local processor means and said random access memory means;
   wherein said control means further operates said random access memory means at a speed higher than the computational speed of said controller processor means or local processor means such that a data transfer between the local processor means and random access memory means is achieved before the controller processor means can complete computation of a path data word, and wherein said control means further operates such that a data word to be transferred from the controller processor means is stored in the pipeline buffer means while a transfer of data between the local processor means and the random access memory means is occurring, and such that a transfer to the random access memory means from the pipeline buffer means is completed before the controller processor means completes its next computation; and
   wherein, when said controller processor means requires a bus data transfer from the random access memory means while a local data transfer between the local processor means and random access memory means is occurring, said controller processor means waits until completion of said local data transfer before requesting said bus data transfer.

17. The circuitry of claim 16 wherein said control means includes a state machine means for occupying a first state and a second state, said first state being entered in response to receipt of said local processor address signals, the second state being entered in response to receipt of said controller address signals.

18. The circuitry of claim 17 further including a first clock means producing a succession of clock edges, and wherein said state machine runs in response to said first clock means.

19. The circuitry of claim 18 wherein said control means causes completion of data transfer between said local processor means and said random access memory means through said second gating buffer means during the period of two said clock edges.

20. The circuitry of claim 19 further including second clock means for driving said local processor means, the clock rate of said first clock means being selected to be higher than that of said second clock means and such that a data transfer is achieved between said local processor means and said random access memory means before said local processor means is capable of generating a second set of local processor address control signals.

* * * * *